Nov. 13, 1945.  A. HIRSCHI  2,388,972

MIXING DEVICE

Filed July 19, 1945

Inventor

Alfred Hirschi

Patented Nov. 13, 1945

2,388,972

UNITED STATES PATENT OFFICE 2,388,972

MIXING DEVICE

Alfred Hirschi, Milwaukee, Wis.

Application July 19, 1945, Serial No. 605,921

3 Claims. (Cl. 259—178)

This invention relates in general to improvements in mixing devices and more particularly to a mechanical device for mixing mortar or the like in a fixed flat bottomed trough.

To obtain batches of mortar of good quality at a reasonable cost the ingredients should be mixed as rapidly as possible with a minimum amount of labor, and only freshly mixed mortar should be contained in each batch. When mortar is mixed by hand in a flat bottomed trough the old mortar is easily removed before fresh ingredients are prepared for mixing, but the length of time and the amount of labor required for mixing are excessive. When mortar is mixed in a mixer of the rotating barrel type now in general use each batch contains a residue of material from the preceding batch. This residue may have had time to set and injure the fresh material being mixed. The mixer is also difficult to clean, particularly when it is used for mixing plaster containing fibrous material, which adheres to the paddles and other internal elements of the mixer.

The above disadvantages may be obviated by using an easily cleaned mechanical device to mix the mortar in a trough of the type usually utilized for hand mixing.

It is therefore an object of the present invention to provide an improved mixing device having all its parts easily accessible for cleaning.

Another object of the present invention is to provide an improved mixing device from which batches of mixed material may be obtained without leaving any residue.

Another object of the present invention is to provide a mixing device for mixing material in a flat bottomed trough.

Further objects and advantages of the invention will be apparent from the following description taken in connection with the accompanying drawing, in which.

Figure 1:
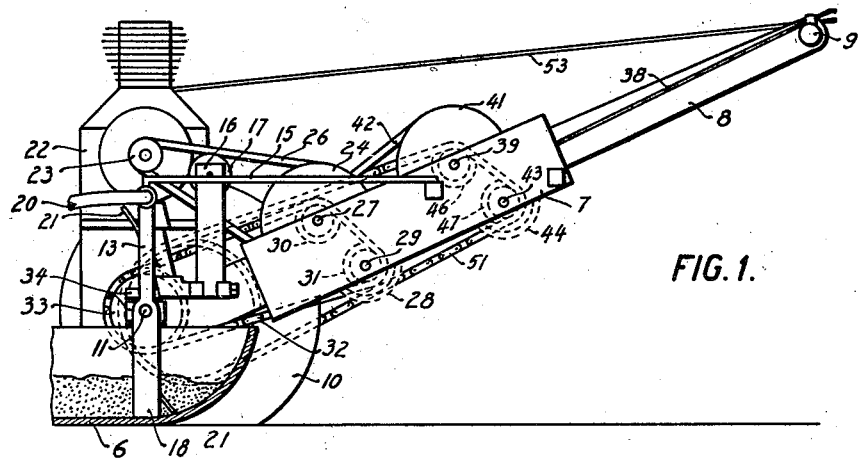
Figure 1 is a view in side elevation of one embodiment of the invention in operating position over a trough shown partially in longitudinal cross-section.

Referring to the drawing, the trough 6 in which mortar is to be mixed is flat bottomed, of rectangular shape, preferably having its two ends built as portions of cylinders of a predetermined radius having horizontal axes and having their surfaces tangential to the bottom of the trough. The trough is to be placed on a level area to provide a path for wheeling the mixer at a constant height with respect to the bottom of the trough.

The mixer comprises a frame 7 characterized by a beam portion 8 carrying a cross handle 9. The frame is provided with a wheel 10 for partially supporting the frame on the ground while the mixer is being moved in a direction parallel to the sides of the trough. Frame 7 supports a rotary shaft 11 mounted in suitable bearings 12. When the mixer is in the operating position shown on the drawing the shaft extends laterally of wheel 10 over trough 6 and is horizontal with its axis parallel to the axis of the wheel. Bearings 12 are preferably mounted in a portion of frame 7 forming a bracket 13 mounted on the major portion of the frame through a hinge 14.

When bracket 13 is swung out as shown on the drawing it is disposed in a vertical plane parallel to the axis of wheel 10. Hinge 14 however is inclined with respect to the vertical so that the bracket may be swung back toward beam 8 in such position as to clear the ground when handle 9 is allowed to rest on the ground. Shaft 11 is then approximately perpendicular to the axis of wheel 10. The bracket may be held securely in either position by a detachable brace rod 15. When bracket 13 is swung back the mixer is supported by wheel 10 and by a second wheel 17 mounted on a second bracket 16.

Figure 2:
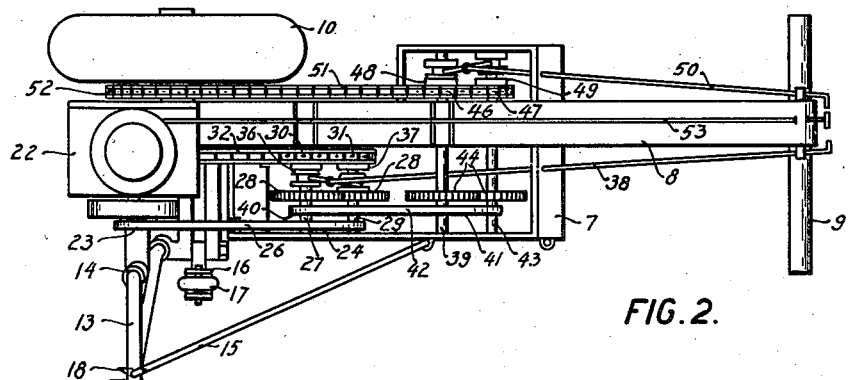
Fig. 2 is a plan view of the embodiment shown in Fig. 1.
Figure 3:
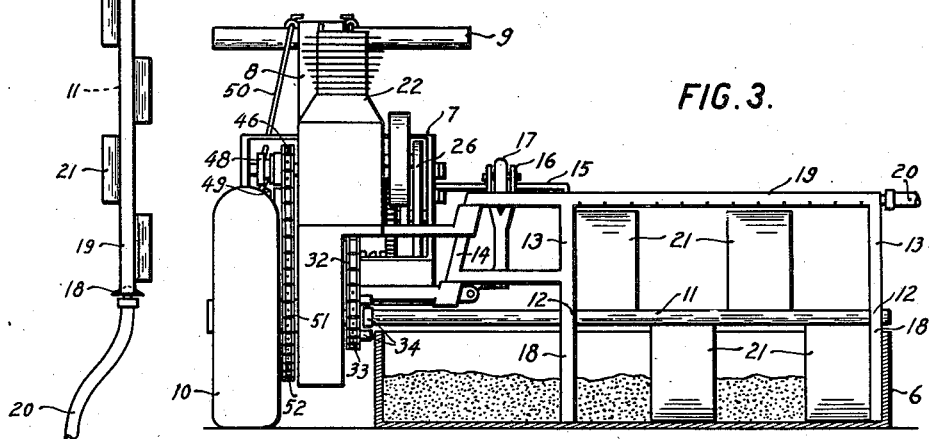
Fig. 3 is an end view of the embodiment illustrated in Fig. 1 showing the trough in transverse cross-section.

Bracket 13 may comprise a pair of feet 18 for partially supporting frame 7 on the bottom of trough 6, the feet sliding on the bottom of the trough during movement of the mixer. The feet are preferably of triangular cross-section as shown in Fig. 2 so as to scrape the sides of trough 6 when moved in contact therewith. The upper portion of bracket 13 preferably consists of a hollow apertured member 19 provided with a detachable coupling for connecting it to a water hose 20. The outer end of bracket 13 may be partially supported on the ground by an additional wheel similar to wheel 10 if desired.

Shaft 11 is provided with suitable mixing means such as paddles 21 distributed over part of its length and assembled on the shaft at different angles. The paddles are preferably curved, of a length equal to the radius of the ends of trough 6. The paddles may accordingly scrape each end area of the trough over its entire height when the axis of shaft 11 is brought into coincidence with the axis of the end cylindrical surface. Feet 18 are of such length that the paddles reach substantially the bottom of the trough for all positions of the mixer between the ends of the trough.

A common motor is provided for driving wheel 10 and shaft 11 at speeds in a predetermined ratio. The motor may be a gasoline engine 22 or an electric motor and may be mounted on frame 7 or set on the ground. When the motor is mounted on the frame, the transmission between the motor and shaft 11 preferably comprises a pair of speed reducing pulleys 23, 24 connected by a belt 26, pulley 23 being mounted on a countershaft 27. The latter is connected by a pair of equal gears 28 to another shaft 29. Shafts 27, 29, which therefore rotate in opposite directions, carry a pair of sprockets 30, 31 connected by a chain 32 to a sprocket 33.

Sprocket 33 is mounted on frame 7 for rotation in alignment with shaft 11, with which it is connected through a detachable coupling such as a claw coupling 34. This coupling is provided with only one pair of claws to allow disengagement of its component parts when bracket 13 is swung back against frame 7 from the position shown. Sprockets 30, 31 are mounted idle on their shafts and may be selectively driven by their shafts through a pair of clutches 36, 37 controlled from the handle through a control rod 38.

Shaft 27 may be connected with another shaft 39 through a second speed reducing drive comprising pulleys 40, 41 connected by a belt 42. Pulleys 40, 41 are preferably V-grooved pulleys of any of the known adjustable pitch types to permit varying the speed relation of shafts 27, 39. Shaft 39 is connected to wheel 10 through a transmission similar to that connecting shafts 27, 11. This second transmission comprises a reversing shaft 43 connected to shaft 39 through gears 44, a pair of sprockets 46, 47, a pair of clutches 48, 49 selectively operable by means of a control rod 50, a chain 51 and a sprocket 52 mounted on wheel 10. The speed of engine 22 may be regulated by means of a throttle control rod 53.

The mixer being brought into the position shown on the drawing, the dry ingredients are placed into the trough. Control rods 38, 50 are manipulated to engage clutches 36, 48 to cause wheel 10 and shaft 11 to turn counterclockwise when viewed as in Fig. 1. The mixer is held by the operator through handle 9 to guide it in its movement from one end of the trough to the other. When shaft 11 reaches the other end of the trough, clutches 36, 48 are disengaged and clutches 37, 49 are engaged to reverse the direction of rotation of wheel 10 and of shaft 11.

The mixer is thus caused to travel continually back and forth during the entire mixing operation. After the dry ingredients have been mixed to form a homogeneous mass the required amount of water is added thereto, at least part of the water being introduced by means of hose 20. The water issues from member 19 as a spray directed toward shaft 11 and paddles 21. This spray washes the shaft and the paddles, thus preventing accumulation of mortar thereon.

In order to render the mixer usable with troughs of different widths the paddles extend over a portion of the length of shaft 11 less than the width of the narrowest trough to be used. During the back and forth movement of the mixer, handle 9 is guided by the operator to cause the paddles to follow alternately the one and the other side of the trough. Feet 18 prevent the paddles from riding on the edges of the trough and also scrape the sides of the trough clean of mortar. Wheel 10 is preferably provided with a pneumatic tire to enable both feet 18 to follow the bottom of the trough while the wheel follows the rugosities of the area over which it travels.

When a batch of mortar has been mixed the mixer is stopped and handle 9 may be rested on the ground, the mixer being brought to one end of the trough and afterwards to the other end so that the trough may be cleaned completely of mortar. Another batch may then be mixed in the manner above outlined. At the end of a working period hose 20 is detached from member 19, brace rod 15 is removed, bracket 16 is swung down to bring wheel 17 to ground level, bracket 13 is swung back against frame 7 and brace rod 15 replaced between a suitable socket on frame 7 and bracket 13 to secure the latter. Bracket 13 and shaft 11 secure bracket 16 in its position. The mixer may then be tipped to clear the edge of the trough and wheeled away on wheels 11, 17.

Although but one embodiment of the present invention has been illustrated and described, it will be apparent that various changes and modifications may be made therein within the scope of the appended claims.

It is claimed and desired to secure by Letters Patent:

1. A device for mixing mortar in a fixed flat bottomed trough comprising a frame, a wheel mounted on said frame for supporting said frame at a constant height above the bottom of the trough, a bracket hingedly mounted on said frame, a shaft mounted on said bracket and having its axis parallel to the axis of said wheel when said bracket is swung out from said frame and having its axis approximately perpendicular to the axis of said wheel when said bracket is swung back against said frame, mixing means on said shaft, and a motor connected with said shaft for driving the same.

2. A device for mixing mortar in a fixed flat bottomed trough comprising a frame, a motor mounted on said frame, a wheel mounted on said frame for supporting said frame at a constant height above the bottom of the trough, a bracket hingedly mounted on said frame, a shaft mounted on said bracket and having its axis parallel to the axis of said wheel when said bracket is swung out from said frame and having its axis approximately perpendicular to the axis of said wheel when said bracket is swung back against said frame, mixing means mounted on said shaft, and a detachable connection between said motor and said shaft for operatively connecting said motor with said shaft when said bracket is swung out to bring the shaft above the trough.

3. A device for mixing mortar in a fixed flat bottomed trough comprising a frame, a wheel mounted on said frame for partially supporting said frame on the ground, a bracket hingedly mounted on said frame, a foot on said bracket for partially supporting said frame on the bottom of the trough when said bracket is swung out from said frame, a shaft mounted on said bracket and having its axis parallel to the axis of said wheel when said bracket is swung out from said frame, a motor connected with said shaft for driving the same, a second bracket hingedly mounted on said frame, and a second wheel on said second bracket for cooperating with the first said wheel in supporting said frame when said second bracket is swung down and the first said bracket is swung back against said frame.

ALFRED HIRSCHI.